United States Patent [19]
Runkel

[11] Patent Number: 6,102,418
[45] Date of Patent: Aug. 15, 2000

[54] HYDROPNEUMATIC SUSPENSION SYSTEM

[75] Inventor: Walter Runkel, Wuppertal, Germany

[73] Assignee: Hemscheidt Fahrwerktechnik GmbH & Co., Germany

[21] Appl. No.: 08/945,633

[22] PCT Filed: Oct. 20, 1995

[86] PCT No.: PCT/EP95/04125

§ 371 Date: Oct. 24, 1997

§ 102(e) Date: Oct. 24, 1997

[87] PCT Pub. No.: WO96/33879

PCT Pub. Date: Oct. 31, 1996

[30] Foreign Application Priority Data

Apr. 26, 1995 [DE] Germany .......................... 195 15 295

[51] Int. Cl.[7] .......................... B60G 11/26; B60G 21/073
[52] U.S. Cl. .......................... 280/124.106; 280/124.159; 267/64.15; 267/64.25; 267/186
[58] Field of Search ...................... 280/124.159, 124.158, 280/124.104, 124.106, FOR 165, FOR 171, FOR 146; 267/64.15, 64.25, 64.26, 186

[56] References Cited

U.S. PATENT DOCUMENTS

| | | |
|---|---|---|
| 3,101,220 | 8/1963 | Wettstein .......................... 280/124.158 |
| 3,356,954 | 12/1967 | Gottschalk . |
| 3,672,628 | 6/1972 | Aanstad . |
| 4,014,510 | 3/1977 | Smith . |
| 5,344,124 | 9/1994 | Runkel .......................... 280/124.159 |

FOREIGN PATENT DOCUMENTS

| | | |
|---|---|---|
| 1 256 864 | 7/1961 | France . |
| 34 27 508 | 2/1986 | Germany . |
| 0 515 991 | 12/1992 | Germany . |
| 4129 819 | 3/1993 | Germany . |
| 42 42 534 | 6/1994 | Germany . |
| 94 07 167 U | 7/1994 | Germany . |
| 2-136319 | 5/1990 | Japan .......................... 267/186 |

OTHER PUBLICATIONS

Patent Abstracts of Japan, vol. 015 No. 060 (C–0805), Feb. 13, 1991, JP,A,02 289419, Nov. 29, 1990.

*Primary Examiner*—Peter C. English
*Attorney, Agent, or Firm*—Jones & Askew

[57] ABSTRACT

A hydropneumatic suspension system, particularly for wheel support in motor vehicles, with at least one spring arrangement (1, 2) having at least one hydraulic spring strut (4), at least one hydropneumatic spring reservoir (6) and at least one damping valve (8). The spring strut (4) includes a cylinder (10) containing a hydraulic medium, and a piston (12), movably guided therein for spring compression and rebound. The piston (12) separates a cylinder space (16) from an annular space (18) surrounding a piston rod (14), wherein the cylinder space (16) is connected via a damping valve (8) with the spring reservoir (6) for producing an elastic force. The annular space (18) of the spring strut (4) is directly connected, while circumventing the damping valve (8), with the respective spring reservoir (6).

27 Claims, 6 Drawing Sheets

6,102,418

HYDROPNEUMATIC SUSPENSION SYSTEM

FIELD OF THE INVENTION

The present invention relates to a hydropneumatic suspension system, particularly for the wheel support in motor vehicles, with at least one suspension arrangement consisting essentially of at least one hydraulic spring strut, at least one hydropneumatic spring reservoir and at least one damping valve, wherein the spring strut consists of a cylinder containing a hydraulic medium and a piston, movably guided therein, for the spring compression and rebound and the piston separates a cylinder space from an annular space surrounding a piston rod and wherein the cylinder space is connected via the damping valve with the spring reservoir bringing about a spring tension.

BACKGROUND OF THE INVENTION

Such a suspension system is described, for example, in European Patent No. 0,515,991 B1. This known system has already proved rather successful, i.e., particularly because it operates in accordance with the new principle of a "stutter-damping arrangement" (for this purpose, also compare German Patent No. 4,117,455 C2), wherein during the rebound of the spring strut, inside the damping valve, a flow path for the hydraulic medium is blocked and reopened in a constantly alternating manner. Hereby, the rapid advance of the spring strut in the rebound, which is detrimental to most applications, is effectively prevented wherein during the rebound a controlled, measured, successive "abatement" of the hydraulic medium passing from the spring reservoir into the spring strut takes place until the rebound movement is entirely completed. In this way, a detrimental, too rapid spring-back movement or recoiling of the wheel onto the road is prevented. In addition, according to EP 0 515 991 B1 (FIGS. 1 and 7), it is provided for this purpose that also the annular space of each spring strut is connected, possibly via an additional damping valve (FIG. 11), with an additional pressure reservoir, so that against the spring resistance, produced by the spring reservoir inside the cylinder space, a certain counterforce is always exerted on the side of the annular chamber. In an alternative embodiment (FIG. 12), the cylinder space and the annular space are connected with the same spring reservoir via one of two damping valves, respectively. All of these measures lead to a rather costly arrangement of structural components (reservoir, damping valves).

SUMMARY OF THE INVENTION

It is the task of the present invention to further improve the known system so that, while costs are reduced in such a way that for system components at least continuously good, particularly improved application properties, primarily with respect to the stabilization of the vehicle for the purpose of guarding against lateral wavering about the longitudinal axis of the vehicle (for example, on curves) and/or against tilting or "pitching" about the transverse axis of the vehicle (for example, during braking) can be achieved.

In accordance with the invention, this is achieved in that the annular space of the spring strut is directly connected with one of the spring reservoirs while the damping valve is circumvented.

By means of this solution of the invention, with a minimum number possible of system components (per spring strut, only one spring reservoir and only one damping valve are required), a very effective stabilization can be achieved.

In the dynamic state, particularly during the rebound of the spring strut, due to the differential annular area in the spring strut, a pressure difference occurs between the cylinder space and the annular space. This is due to the fact that the hydraulic medium flowing into the cylinder space flows across the damping valve representing a "flow resistance," while simultaneously hydraulic medium flows from the annular space, in a manner involving virtually no flow loss, into the spring reservoir, since in the connection from the annular space to the spring reservoir—except for slight flow losses in the lines—no pressure-influencing elements are present. This causes the reservoir pressure to exist virtually in the annular space, while in the cylinder space—dependent on the damping valve—a reduction in pressure occurs. Hence, advantageously, the higher annular space pressure produces a "braking force" against the direction of the rebound which contributes to the stabilization and also is a positive prerequisite for further advantageous stabilization measures which are to be explained in even greater detail in the following text.

In connection with the invention, it is particularly advantageous to apply the known principle of "stutter damping," and to carry out in particular also a special interconnection of at least two spring arrangements, respectively, inside a vehicle so that at this point, ample reference is made to the publications dealing with these complexes of characteristics: DE 41 17 455, DE 41 29 819, EP 0 515 991, as well as DE 42 42 534 and DE 43 14 021.

BRIEF DESCRIPTION OF THE DRAWINGS

By means of the drawing, the invention is to be explained in greater detail in example form, wherein.

DETAILED DESCRIPTION OF PREFERRED EMBODIMENTS

Figure 1:
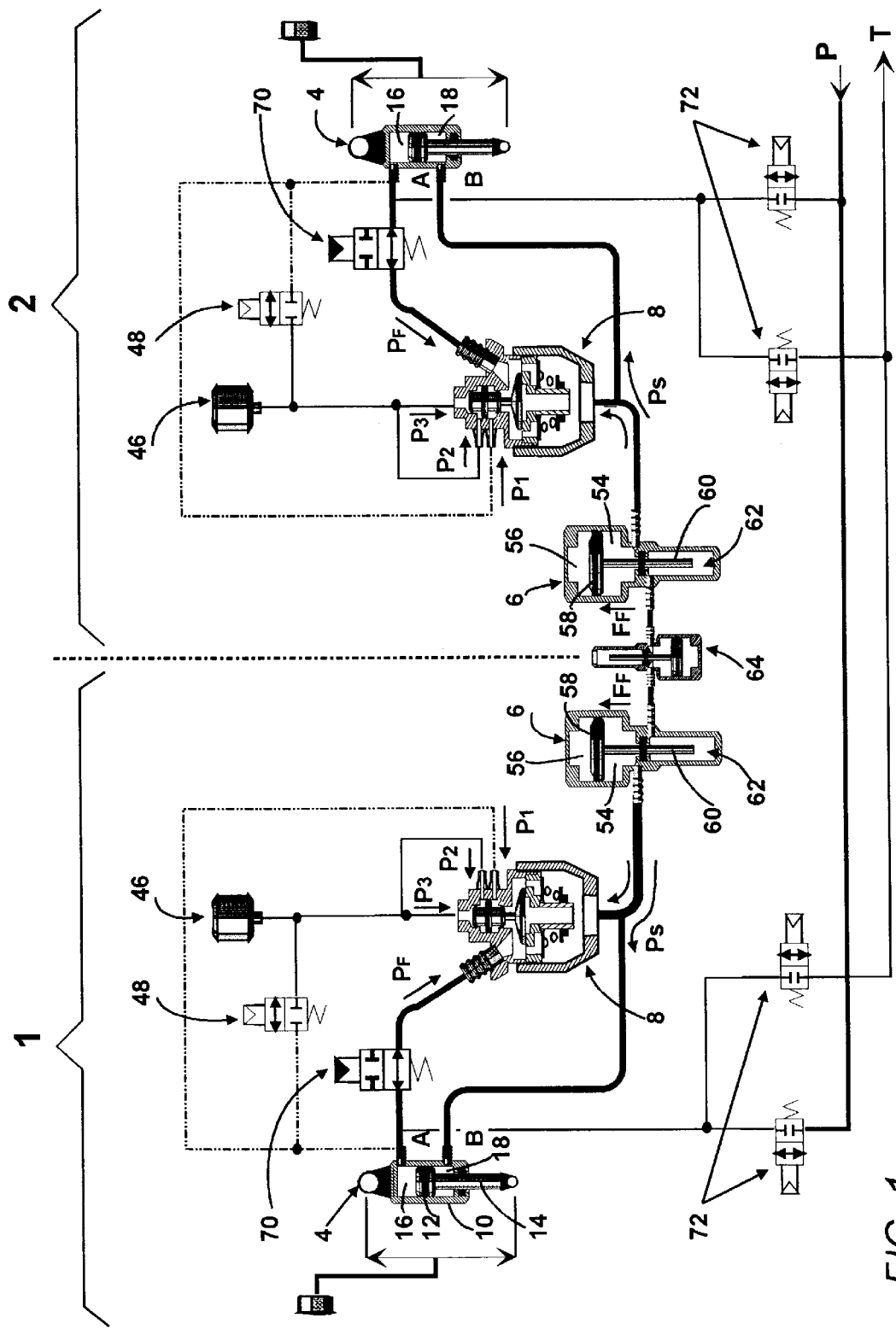
FIG. 1 shows a first example of a suspension system of the invention with two spring arrangements with spring struts and accompanying spring reservoirs and damping valves, arranged in particular on opposing sides of a vehicle axis, wherein the individual components are respectively shown in basic, greatly simplified longitudinal cross-sections.

In the various figures containing drawings, identical or functionally corresponding parts and components are always described with the same reference numbers and, for that reason, are respectively described only once as a rule.

In each of FIGS. 1–4, as well as 6, for example, a suspension system of the invention with two suspension arrangements (1, 2) is shown which, preferably, are interconnected via special steps to be explained in greater detail in the following text. Each spring arrangement (1, 2) consists as a main component of a hydraulic spring strut (4), a hydropneumatic spring reservoir (6) hydraulically connected with same, as well as a damping valve (8), arranged between the spring strut (4) and the spring reservoir (6).

Each spring strut (4) consists—in a known way—of a cylinder (10), containing a hydraulic medium, and a piston (12), movably guided therein for the spring compression and rebound, and inside the cylinder (10), the piston (12) separates a cylinder space (16), facing away from a piston rod (14), from an annular space (18) surrounding the piston rod (14). The respective spring strut (4) is arranged in a vehicle for the wheel or axle support between a non-spring-loaded mass (wheel) and a spring-loaded mass (frame). Hereby, during spring compression, the hydraulic medium is displaced from the cylinder space (16) into the respectively accompanying spring reservoir (8) and during rebound, the hydraulic medium then flows back accordingly. Due to an opposing volume change of the annular space (18), there occurs here a respectively reverse flow, wherein the differential volume of the hydraulic medium, corresponding to the respectively displaced piston rod volume, is respectively adjusted inside the spring reservoir (6). At that point, by means of the spring reservoir (6), a corresponding elastic force or supporting force of the spring strut (4) is achieved.

Each spring strut (4) has two hydraulic connections, i.e., a connection (A), opening into the cylinder space (16), and a connection (B), opening into the annular space (18). The connection (A) of the cylinder space (16) is connected via the damping valve (8) with the spring reservoir (6).

In contrast thereto, in the embodiments of the invention according to FIGS. 1–4, the annular space (18) of each spring strut (4) is connected via the connection (B) directly, i.e., "past the damping valve (8)," with the same spring reservoir (6) as the cylinder space (16). Here, it is advantageous when the line connection provided for this purpose has as low a flow resistance as possible. This favorably impacts on the initially mentioned pressure difference occurring in the dynamic state of rebound between the cylinder space (16) and the annular space (18).

Figure 5:
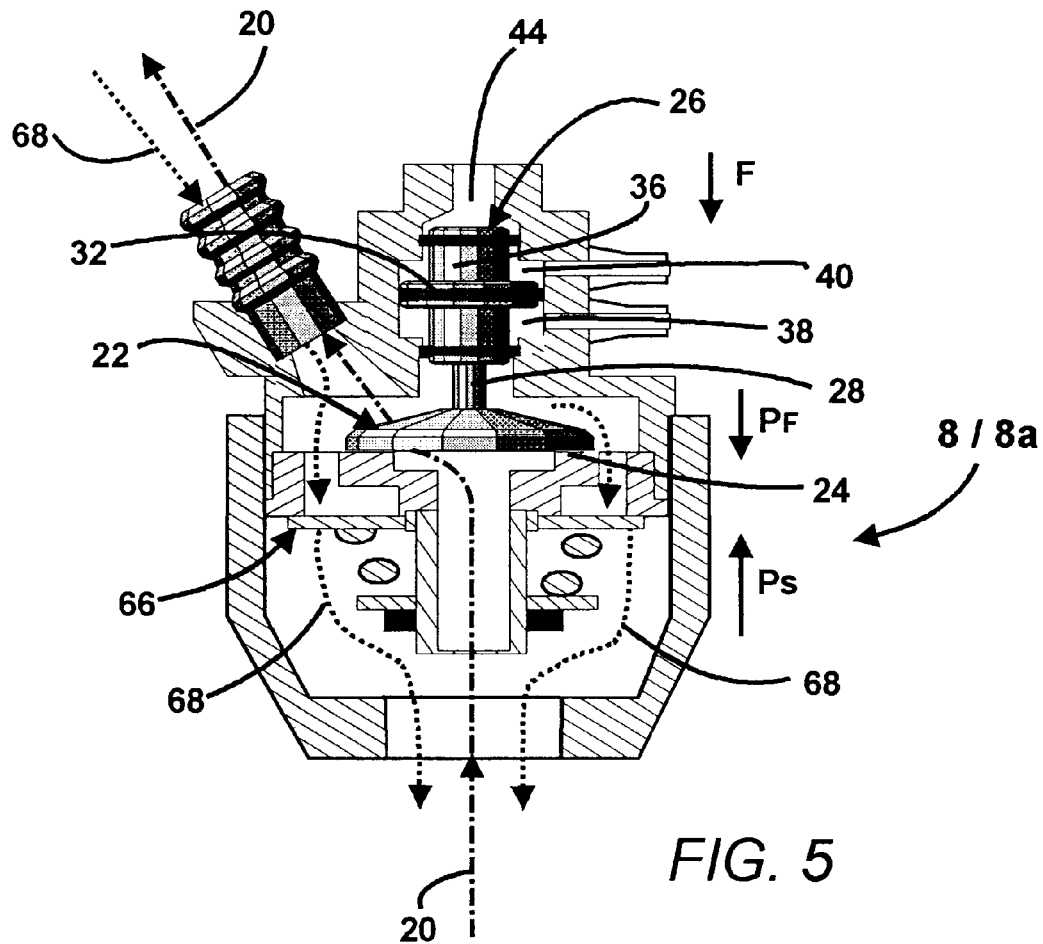
FIG. 5 shows a representation that is enlarged with respect to FIGS. 1–4, of a preferred embodiment of a damping valve used in connection with the suspension system of the invention.

Preferably, the (or each) damping valve (8)—see FIG. 5—is constructed in such a way that the hydraulic rebound flow occurring during the rebound of the spring strut (4) is guided from the spring reservoir (6) in the direction of the spring strut (4) via a flow path (20) of the damping valve (8)—shown in FIG. 5 in the form of broken lines—and at that time is damped due to the fact that the flow path (20) is constantly closed and again opened in an alternating manner by means of a valve element (22). For this purpose, the valve element (22) interacts with a valve seat (24) in a check valve-like manner. Here, the valve element (22), on the one hand, is charged in its opening direction with the hydraulic pressure $(p_s)$ of the spring reservoir (6) and on the other hand in its closing direction with the hydraulic pressure $(P_f)$ of the cylinder space (16) of the spring strut (4), and preferably also with an elastic, particularly variable closing force (F) in such a way, that the valve element (22), in the event of a rebound flow, closes and opens the flow path (20) automatically in a manner controlled by differential pressure. This occurs in a way, wherein the valve element (22) closes when the two hydraulic pressures $(p_s$ and $p_f)$ are the same or when a certain, relatively small pressure difference is present and opens in the case of an increasing pressure difference occurring in the closed state due to a drop of the pressure $(p_f)$ caused thereby and present inside the cylinder space (16) of the spring strut (4), i.e., when a predetermined or variable amount of this pressure difference is attained. In this connection, again reference is made to the above-mentioned publications, particularly to DE 42 42 534.

For the purpose of varying the damping characteristics, the elastic closing force (F) is preferably variable. For this purpose, the (or each) damping valve (8) has a control tappet (26), having an effect on the valve element (22) in the direction of closure of same and capable of being charged with control pressure (see in particular FIGS. 5 and 5a).

In a further embodiment of the invention, not recognizable in the drawings of the figures, a bypass bridging the valve element (22) is provided which in particular is in the form of a passage channel extending through the valve element (22) that may be closed or opened hereby preferably by means of the control tappet (26). For this advantageous step, reference is made in particular to the publications DE 42 42 534 and DE 43 14 021.

Figure 5A:
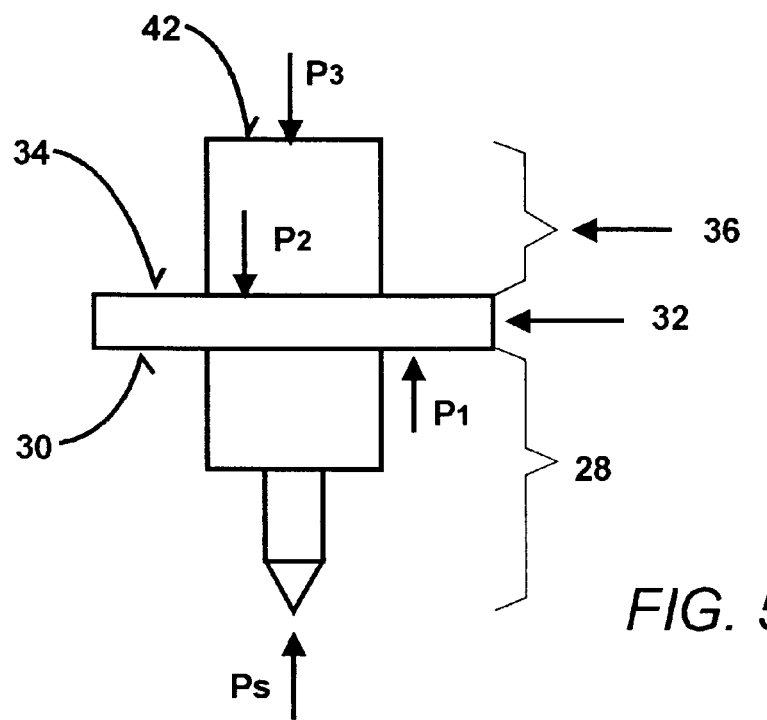
FIG. 5a shows a separate representation of an individual part of the damping valve, i.e. a control tappet.

As can also be gathered from FIGS. 5 and 5a, the control tappet (26) is preferably constructed as a differential piston, wherein this differential piston has a first section (28), facing the valve element (22) and charged by the hydraulic pressure $(p_f)$ of the spring strut cylinder space (16), a second section (32) of enlarged cross section following same via a first annular face (30), as well as a third section (36) of diminished cross section following same via a second annular face (34) (see also FIG. 5a). The second section (32) can be charged on the side of the first annular face (30) and a first control pressure chamber (38) formed there, with a first control pressure $(p_1)$. On the side of the second annular face (34), a second control pressure chamber (40) is formed which can be charged with a second control pressure $(p_2)$. Finally, the third section (36), on its front face (42) facing away from the second section (32), and a third control pressure chamber (44) formed there, can be charged with a third control pressure $(p_3)$. In this arrangement, the respective control pressure chambers (38,40,44) are separated from each other in a pressure-controlled manner via sealing elements of the control tappet (26).

With respect to the wiring of the control pressure chambers (38,40,44), there exist numerous different possibilities of which two possibilities are to be explained in the following text by means of examples.

In accordance with FIG. 1, as a second and third control pressure $(p_2,p_3)$, the static pressure of the respectively accompanying spring strut cylinder space (16), accommodated in a special pressure reservoir (46), is used. For this purpose, between the cylinder space (16) and the pressure reservoir (46), an on-off valve (48) is arranged which, in the static position of the spring strut (4), is briefly connected through once in order to introduce in this way the static pressure into the pressure reservoir (46). Subsequently, the on-off valve (48) is closed. The pressure reservoir (46) is directly connected with the second and third control pressure chamber (40,44). At that point, preferably the first control pressure chamber (38) is connected directly with the spring strut cylinder space (16), so that the dynamic pressure of the spring strut cylinder space (16) acts as a first control pressure $(p_1)$. Hereby, there occur in the dynamic state, particularly during the rebound, pressure differences between the first control pressure $(p_1)$, on the one hand, and the second and third control pressure $(p_2, p_3)$, on the other hand, whereby via the control tappet (26) the damping characteristic of the damping valve (8) is influenced.

Figure 2:
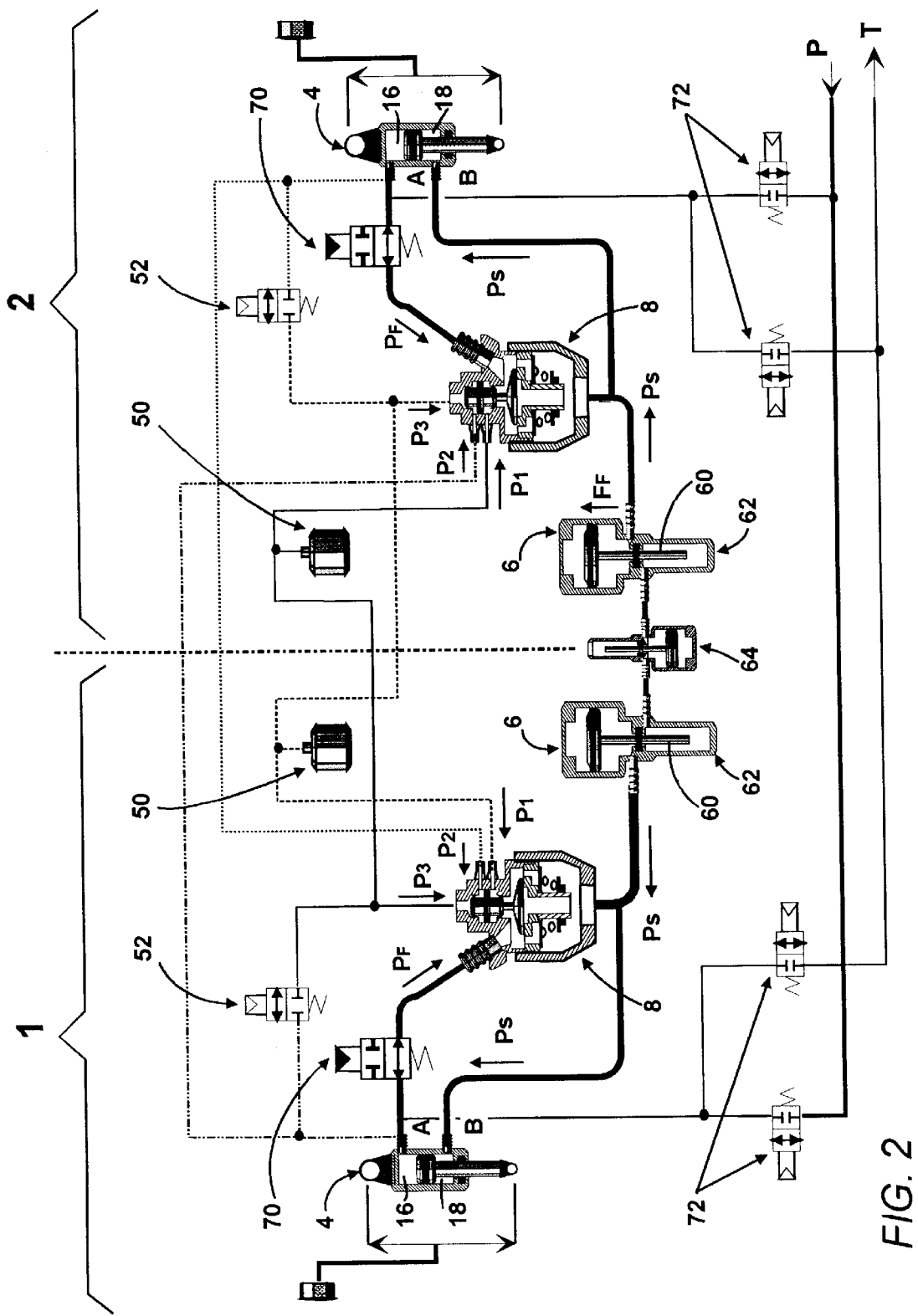
FIG. 2 shows a second example of the suspension system of the invention in a representation analogous to FIG. 1.
Figure 3:
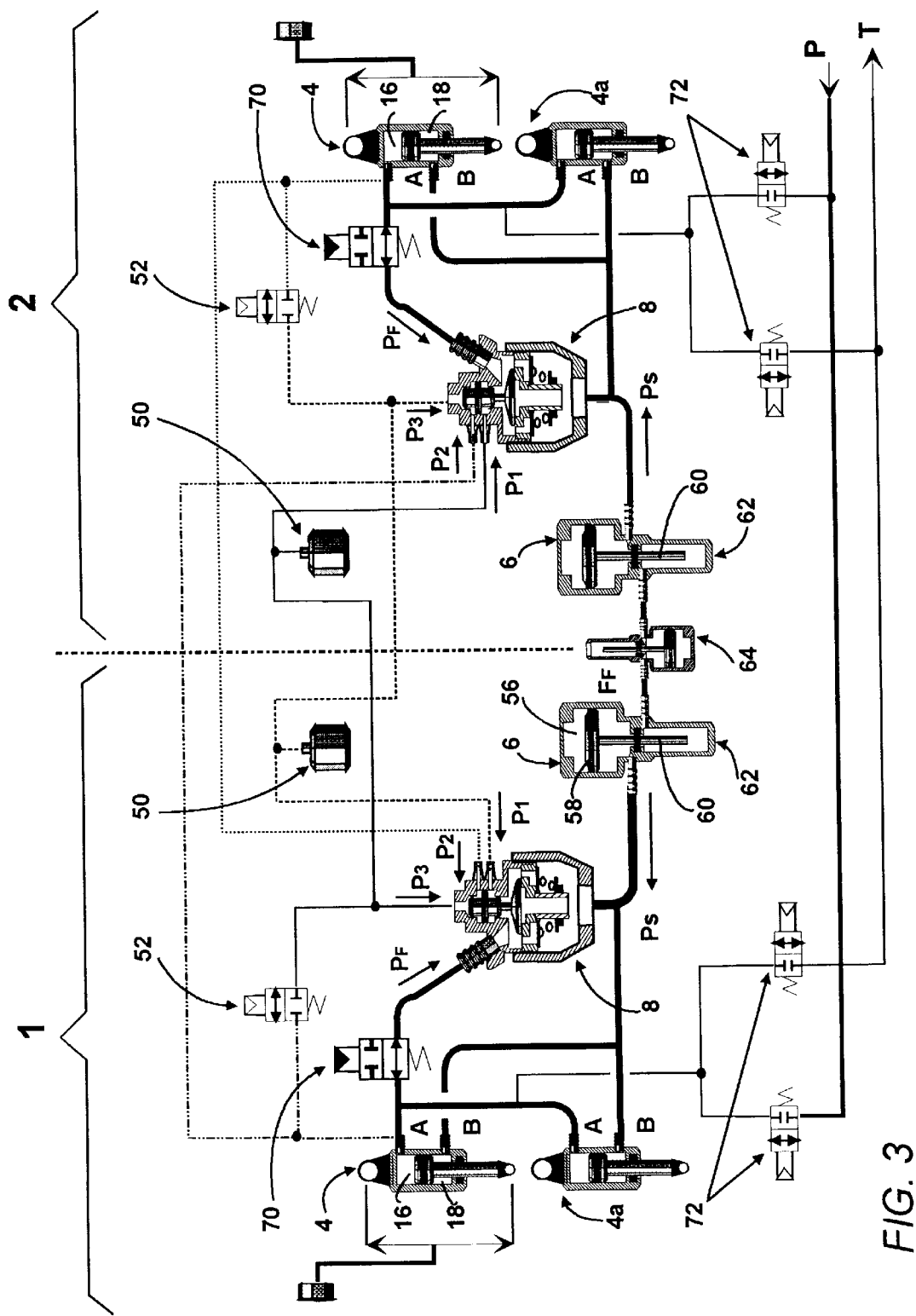
FIG. 3 shows a corresponding representation of a third example of the suspension system of the invention.
Figure 4:
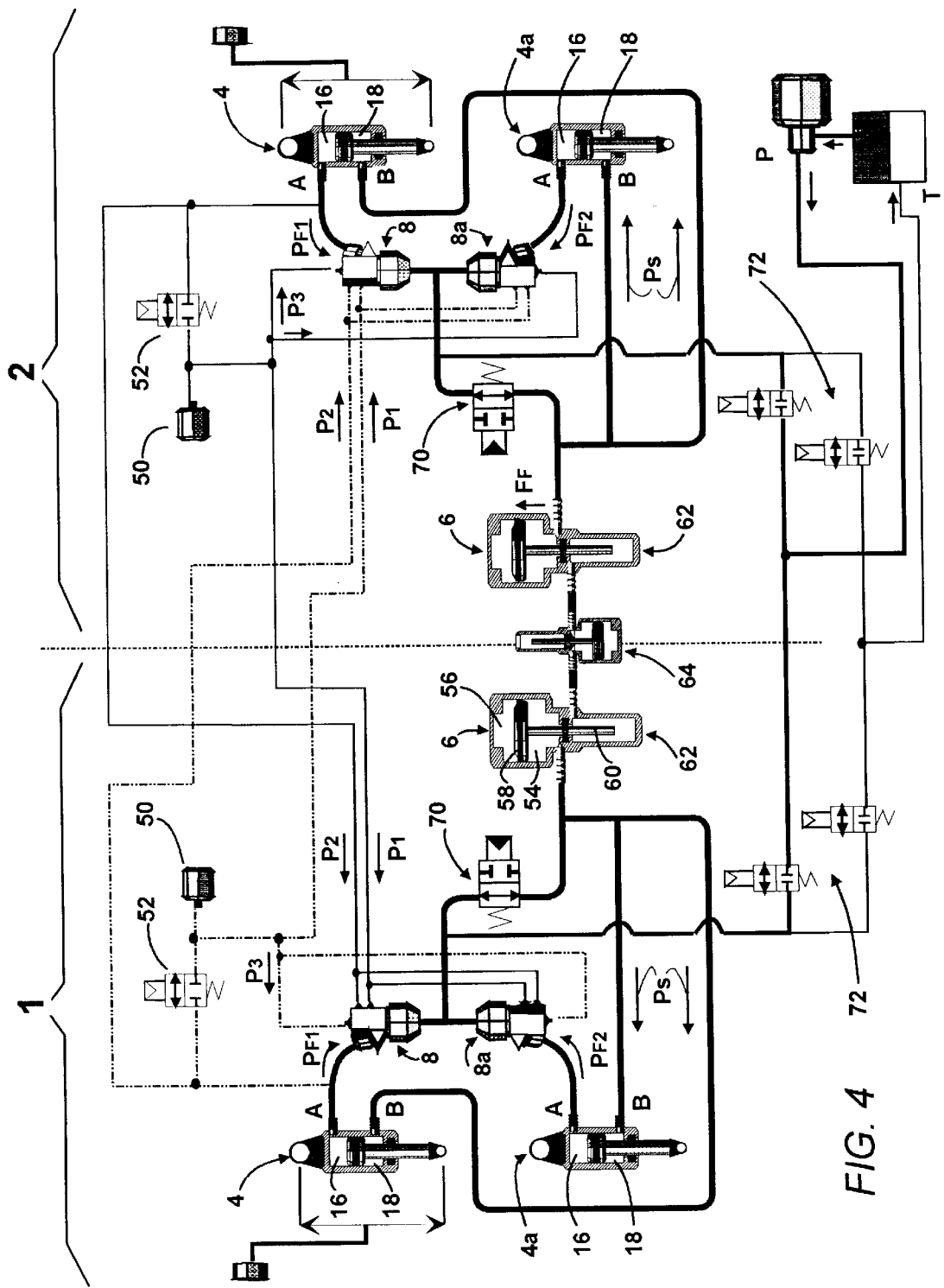
FIG. 4 shows a fourth embodiment of the suspension system of the invention.

In the embodiments in accordance with FIGS. 2, 3 and 4, for the stabilization of a vehicle against rocking and/or dipping movements, provisions are made wherein the (at least) two spring arrangements (1,2) interact by means of "crosswise control" of the control pressures $(_1,p_2,p_3)$. For this purpose, preferably with each damping valve (8) as a first control pressure ($p_1$), the static pressure of the respectively different, facing spring strut cylinder space (16), accommodated in a pressure reservoir (50), is used. Via a direct connection, the dynamic pressure of the respectively other spring strut cylinder space (16) serves as a second control pressure ($p_2$). Finally, as a third control pressure ($p_3$), the static pressure of the respectively accompanying spring strut cylinder space (16), accommodated in the respectively opposite "static pressure reservoir" (50), is used. Similar to the embodiment according to FIG. 1, before each pressure reservoir (50), an on-off valve (52) is arranged for the purpose of introducing the respective static pressure briefly into the pressure reservoir (50) and in order to accommodate it there.

With the embodiments according to FIGS. 3 and 4, within each spring arrangement (1,2), at least two hydraulic spring struts (4,4a) arranged in parallel are provided. In this way, it is possible to realize by means of this parallel arrangement of two spring struts (4,4a) a so-called jointed cross-shaft axle. A parallel arrangement, not shown, of respectively three spring struts leads to a so-called "triple axis." Here, between the spring struts, there always occurs an equalization of pressure, whereby it is achieved that all wheels are kept on the ground simultaneously. For this purpose, according to FIG. 3, on the one hand, the cylinder spaces (16) and, on the other hand, the annular spaces (18) of the spring struts (4, 4a) are respectively connected with each other directly, at which point the cylinder spaces (16) are connected with the spring reservoir (6) via the same damping valve (8). Also in this case, in accordance with the invention, the annular spaces (18) are connected directly, "past the damping valve (8)," with the spring reservoir (6). Since with this embodiment in accordance with FIG. 3 it is possible for undamped oscillations to occur between the spring struts (4,4a) arranged in parallel, it is advantageously provided in the embodiment according to FIG. 4, that the annular spaces (18) of the spring struts (4,4a) are connected directly with each other and with the spring reservoir (6), while each cylinder space (16) is assigned its own damping valve (8,8a) and the damping valves (8, 8a) are connected on the other side with each other and with the spring reservoir (6). This arrangement results in that, advantageously, in the connection -between the cylinder spaces (16), the two damping valves (8,8a) are always located, so that resonance oscillations are effectively prevented. Preferably, here, the two damping valves (8,8a) are arranged in parallel with respect to the control bridge ($p_1,p_2,p_3$), i.e., they have the same control pressure wiring.

With the arrangement according to FIG. 4, the hydraulic pressures ($p_f$) of the spring struts (4,4a), which are interconnected via the two damping valves (8,8a), may at times deviate from each other, for which reason they are described in FIG. 4 with different identification symbols ($p_{f1}$ and $p_{f2}$). From this, it becomes clear that an intended "detuning" of the system which is basically capable of oscillating, is achieved by the introduction of the damping valves (8, 8a).

Figure 6:
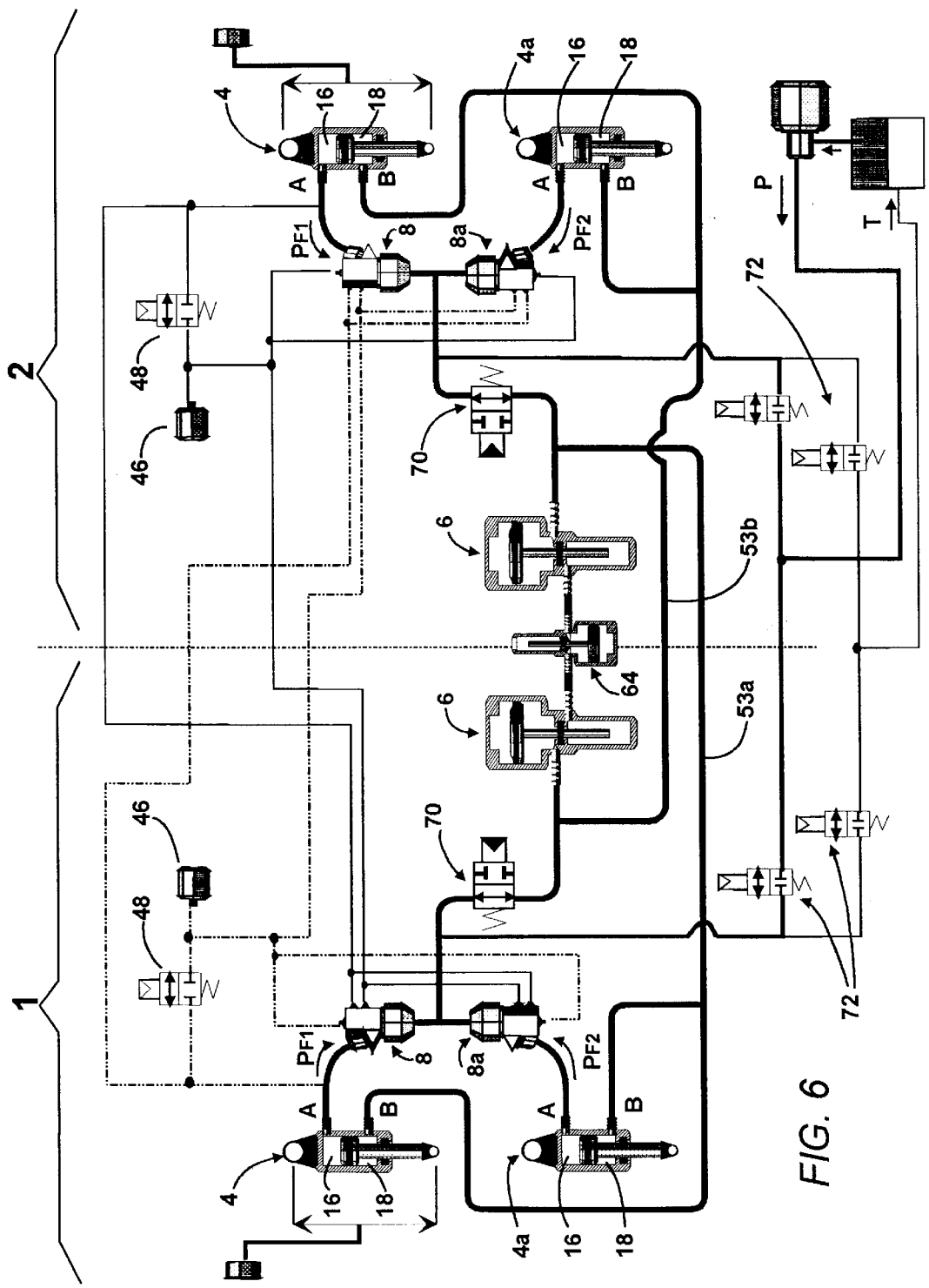
FIG. 6 shows an additional embodiment of the suspension system of the invention in a representation analogous to FIG. 1.

The embodiment of the suspension system of the invention shown in FIG. 6 corresponds extensively to the embodiment according to FIG. 4. An important difference, however, consists in that according to FIG. 6, respectively, the annular space (18) of each spring strut (4,4a) of the one spring arrangement (1 or 2) is connected directly via one of two crosswise connections (53a,53b) with the spring reservoir (6) of the other spring arrangement (2 or 1). By means of this step, a particularly effective stabilization is achieved which will be explained in even greater detail below. For this reason, this embodiment is suited particularly well for vehicles with high and/or heavy superstructures, such as cement mixers, gravel trucks and the like.

Before the mode of operation of the individual hydraulic circiut variations is briefly explained, several additional characteristics of the circuit arrangement and specific further developments are to be explained.

In all embodiments, each spring reservoir (6) is preferably constructed in the form of a piston reservoir with a storage space (54), hydraulically connected with the spring strut (4) and a spring chamber (56) containing a compressible medium, particularly gas, separated by a piston (58), wherein the separation piston (58) is preferably connected with a separation piston rod (60) extending out of the piston reservoir. Due to the separation piston rod (60), the separation piston (58) has two surfaces which vary in size and are charged with pressure, so that it acts as a pressure converter in such a way that the hydraulic pressure is always greater than the pneumatic pressure. Here it is advantageous, for the purpose of influencing the suspension characteristics, to charge the separation piston (58) via the separation piston rod (60) with an additional elastic force ($F_f$). In the preferred embodiments of the invention shown, this additional elastic force ($F_f$) is produced by means of a pressure medium cylinder (62), having an effect on the separation piston rod (60), wherein the pressure medium cylinder (62) is connected with a reservoir (64) producing in particular a hydraulic pretension pressure. Preferably, at this point, the separation piston rod (60) is guided into the pressure medium cylinder (62) in the manner of a plunger, so that it is charged, due to application of the pressure of the reservoir (64), with a force ($F_f$) which is effective in the direction of the separation piston (58) and thus is effective in the direction of the force produced by the hydraulic pressure. In this way, that additional elastic force has the tendency to further reduce or compress the volume of the spring chamber (56). To this complex of characteristics, additionally, reference to the publication DE 42 34 217 A1 is also made.

As an additional stabilization step, it is also provided that (at least) two suspension arrangements (1,2) are interconnected, in that the pressure medium cylinders (62) assigned to their spring reservoir (6) for producing the additional elastic force ($F_f$), are connected with the same pretension pressure reservoir (64). Here, reference is made to the full extent to DE-GM 94 07 167.

The suspension arrangements (1,2) or their spring struts (4) which, respectively, are interconnected or acting together for stabilization purposes, may be arranged in a vehicle on opposing sides (left/right) of an axis (the same axis). Furthermore, there exists the possibility of arranging these spring struts (4) of the interconnected spring arrangements (1,2) on the same vehicle side on different axes. Finally, there exists also the possibility of arranging the spring struts of the interacting suspension arrangements (1,2) on opposing vehicle sides and at different axes (crosswise arrangement).

As can be seen best in FIG. 5, in all embodiments, to the flow path (20) guiding the rebound flow and to the valve element (22) of each damping valve (8,8a), a check valve (66) is assigned in a hydraulically parallel manner and having an opposing effect with respect to the direction of flow. This check valve (66) opens essentially without a throttling effect in the event of a spring compression flow from the spring strut cylinder space (16) to the spring reservoir (6) and it closes in the presence of a reversed rebound flow, so that then—in the above-described manner—the valve element (22) has a stutter-damping effect in the flow path (20). In FIG. 5, the spring compression flow via the check valve (66) is demonstrated by means of broken lines (68).

In another embodiment of the invention, which is shown in FIGS. 1–4 as well as 6, the connection between each spring strut cylinder space (16) and the accompanying spring reservoir (6) can be blocked by means of a blocking valve (70). Furthermore, preferably the cylinder space (16) of each spring strut (4,4*a*) can be connected selectively via a leveling arrangement (72), consisting of a certain valve arrangement with a hydraulic pressure line (P) or a tank return pipe (T). This serves in particular for the purpose of adjusting the static level of the spring struts (4,4*a*).

In the following, several remarks regarding the suspension system's mode of operation, in accordance with the invention, are made.

Due to the "annular space wiring" of the invention of the spring struts (4,4*a*), particularly due to the special function of the damping valves (8,8*a*), there occurs in the dynamic state during the rebound a pressure difference between the cylinder space (16) and the annular space (18), i.e., the pressure in the cylinder space (16) drops below the reservoir pressure effective in the annular space (18). Hereby, too strong a rebound is prevented. This effect is also supported by the special control pressure arrangement of the damping valve (8,8*a*).

With the embodiments according to FIGS. 2–4 and 6 with "crosswise control" of the control pressures, an effective stabilization of a vehicle, particularly with respect to lateral rocking motions can be achieved. For example, when the vehicle is driven through a left-hand curve, the right spring strut (4) undergoes a spring compression, while the left spring strut (4) has the tendency to undergo a rebound. This rebound movement is effectively counteracted by means of the invention, i.e., particularly in that the increased pressure of the right side is used as a control pressure on the left side, so that the valve element (22) of the damping valve (8) located there is charged with a greater "closing force". Hereby, the damping is increased so that the pressure difference between the cylinder space (16) and the annular space (18) is increased.

With the embodiment according to FIG. 3, the arrangement functions as follows. If, for example, the left spring strut (4) undergoes a spring-compression, then hydraulic medium is displaced out of its cylinder space (16). Then the latter flows via the damping valve (8) into the accompanying (left) spring reservoir (6). Since at that point the annular space (18) of the spring strut (4) becomes larger, hydraulic medium also flows from the reservoir (6) directly and essentially without flow losses into the annular space (18). In this way, there is left in the spring reservoir (6) a remaining volume that corresponds to the "displaced piston rod volume." Hereby, in the spring reservoir (6), the separation piston (58) is displaced in the direction of the spring chamber (56), whereby the pneumatic pressure is made to rise and thus also the hydraulic pressure. Hence, this higher pressure occurs also in the second, spring strut (4*a*) arranged in parallel. Hence, also here, the supporting force increases, so that this spring strut (4*a*) undergoes a rebound. Hereby, hydraulic medium must flow into its cylinder space (16) and from the annular space (18), hydraulic medium is displaced. The differential volume resulting from this movement of the second spring strut (4*a*) is also fed from the accompanying spring reservoir (6). This change of the hydraulic volumes between the two spring struts (4,4*a*), that are hydraulically coupled with each other, and the accompanying spring reservoirs (6), takes place very rapidly. Hereby, it is assured that the pressures in the system equalize, so that at any point in time of a spring movement, the pressures in the two spring struts (4,4*a*) and hence also the supporting forces of both spring struts are equal.

The same process, i.e. with appropriately reversed direction of flow, also takes place when one of the spring struts (4,4*a*) undergoes a rebound.

The hydraulic exchange between the two spring struts (4,4*a*) arranged in parallel and the accompanying spring reservoirs (6) depends on the speed at which the vehicle is moving. At low speed, for example, while crossing an obstacle, the lifting movement of a spring strut is relatively slow. The change in force per time having an effect on the vehicle frame is relatively small. Hence, also the acceleration force which the vehicle exerts against the lifting movement is relatively small. The vehicle can then lift without an essential change in force. As already described, the hydraulic pressure between the individual spaces of the two spring struts (4,4*a*) becomes equalized. The result of this equalization is that during slow speed, practically only one hydraulic equalization takes place between the spring struts (4,4*a*), at which point the vehicle merely makes a lifting movement that is half the height (with a sine shape) of the respective obstacle. No nominal additional forces due to the passing across the obstacle have an effect on the frame of the vehicle. At a rapid driving speed, acceleration forces are created by the vehicle. The vehicle exerts a force against the lifting movement. At this point, there occurs not only a hydraulic equalization between the two spring struts (4,4*a*) arranged in parallel, but hydraulic medium is also displaced into the accompanying spring reservoir (6). The lifting movement of the vehicle becomes smaller; however, the pressures in the two spring struts become greater, i.e., again equally great in both spring struts. Due to the pressure equalization and the load equalization caused thereby between the two spring struts (4,4*a*), there does not exist the full force—in upward direction due to the vehicle acceleration—at the connection point of each spring strut to the frame, but merely half the force since the forces are distributed evenly on both spring struts (4,4*a*). In contrast thereto, in the case of a single wheel suspension, the full acceleration force would be introduced locally at the point where the spring strut connects to the frame.

The influence of the damping valve (8) during the rebound is now such that "above" the static position, the adjustment element of the control tappet (26) is practically "switched off," so that essentially only the valve element (22) is active as a regulating element. The valve element (22) responds as a regulating element to the flow rate of the hydraulic medium and in this way also to the speed of rebound of the respective spring strut (4,4*a*). If the speed of rebound becomes too great, then the valve element (22)— dependent on the flow rate—pulls itself against the valve seat (24). Hereby, the path from the pressure reservoir to the spring strut is interrupted. The pressure in the cylinder space (16) drops sharply. Hereby, a great difference in pressure is created between the cylinder space (16) and the reservoir pressure. If a certain pressure difference is achieved, the valve element (22) opens again and this adjustment process starts anew. On the one hand, due to the strong pressure drop in the cylinder space (16) and, on the other hand, due to the above-described "braking force" due to the special "annular space arrangement", the speed of rebound of the spring strut above the static position is braked gradually so that it undergoes the rebound in an uninterrupted manner, but not too fast.

In the direction of the rebound "below" the static position, the control tappet (26) is then also active as an additional regulating element. Hereby, the pressure drop inside the cylinder space (16) with respect to the reservoir pressure is increased essentially. This greater pressure drop leads to the point where also the pressure difference between the cylinder space (16) and the annular space (18) becomes even greater. Hereby, the rebound below the static position is braked more vigorously than above the static position. Hereby, the wheel is not pushed as forcefully into a sagging downward position by means of the elastic force since the total effective elastic force is "cylinder space force" minus "annular space force."

According to FIG. 3, also a stabilized lateral rocking is achieved. For this purpose, the described rebound process below the static position has the essential stabilizing effect. During rocking, the one side of the vehicle undergoes a spring compression and the other one does not. The spring compression side follows during the compression process along the characteristic curve of the spring of the spring reservoir (6). In contrast thereto, on the rebound side, on the one hand, the pressure inside the cylinder space (16) is extremely reduced by means of the damping valve (8) and, on the other hand, the pressure inside the annular space (18), which with respect to the pressure inside the cylinder space (16) is higher, causes the vehicle to be practically held tightly on the rebound side with a certain "annular space force". The operation of the damping valve (8) is designed in such a way that the annular space force cannot become so great that same can lift off the axle while a curve is being negotiated. For this reason, with this arrangement and despite the greater stabilization, advantageously driving in the countryside is possible.

The embodiment according to FIG. 4 distinguishes itself from FIG. 3 in that in the respective connection between the cylinder spaces (16) of the interconnected spring struts (4, 4a), the two damping valves (8,8a) are arranged. It has already been mentioned above that hereby undamped oscillations between the two spring struts (4,4a) are prevented.

With the embodiment according to FIG. 6, by means of the "crosswise arrangement" of the annular-space reservoir connections (53a,53b), an extremely "tight" stabilization is achieved in that during the tilting or rocking movements, respectively, on the rebound side, an increase of the pressure inside the annular space (18) occurs and in the cylinder space (16), due to the mode of operation of the respective damping valve (8,8a), a small pressure occurs. This difference in pressure acts against the rebound in that the spring strut (4,4a) has the tendency to contract or to undergo a spring compression. On the opposite spring compression side, an exactly reversed effect occurs, so that as a whole the respective tilt of the vehicle is counteracted very clearly.

In all of the embodiments shown, advantageously, due to the blocking valves (70), on the one hand, the spring struts may be blocked together or individually and, on the other hand, advantageously, the axes may also be pulled in the direction of the vehicle frame. This process takes place as follows. The blocking valves (70) are switched into their blocking position particularly in a hydraulic manner. Hereby, the connection from the cylinder space (16) to the spring reservoir (6) is blocked, so that no more hydraulic medium can be exchanged between the spring strut and the reservoir. Now, the valves of the leveling arrangement (72) are arranged in such a way that the cylinder spaces (16) are connected with the tank return pipe (T). For this reason, the hydraulic medium can flow from the cylinder spaces (16) towards the tank. In accordance with the invention, the annular spaces (18) are connected with the spring reservoir (6) even when the blocking valves (70) are in the blocking position so that, now as before, the pressure of the respective spring reservoir (6) is present in the annular spaces (18). Due to the connection of the cylinder spaces (16) with the tank, the pressure here is practically equal to zero. Hereby, it is possible for the reservoir pressure present in the annular space (18) to lift the axle or the wheel, at which point the hydraulic medium is displaced out of the cylinder spaces towards the tank. During this procedure, the spring struts must be adapted in their dimensions, particularly with respect to the dimensions of the annular space (18), to the respective vehicle conditions. The surface of the piston (12), charged with pressure from the annular space (18), must at any rate be great enough so that the reservoir pressure times the pressure-charged surface produces a force that can lift the weight of the axle or wheel, respectively.

The invention is not limited to the shown and described examples of embodiments but encompasses also all embodiments operating equally in accordance with the concept of the invention. Furthermore, so far, the invention is not yet limited to the combination of characteristics defined in the claim, but it may also be defined by any desired other combination of certain characteristics of the total of all disclosed individual characteristics.

What is claimed is:

1. Hydropneumatic suspension system for supporting wheels of a motor vehicle, comprising:
    at least one suspension arrangement (1, 2) comprising at least one hydraulic shock-absorber (4, 4a), at least one hydropneumatic spring (6) and at least one damping valve (8, 8a);
    the shock-absorber (4, 4a) including a cylinder (10) containing a hydraulic medium and a piston (12) guided therein for compression and rebound movements, the piston (12) separating a cylinder volume (16) from an annular space (18) surrounding a piston rod (14);
    the cylinder volume (16) connected via the damping valve (8, 8a) to the hydropneumatic spring (6) so as to produce a spring force;
    the damping valve (8, 8a) being operative such that a hydraulic rebound flow, occurring when the shock-absorber (4, 4a) rebounds, passes via a flow path (20) through the damping valve (8, 8a) and is damped thereby;
    the flow path (20) including a valve element (22) operative to continually alternately close and reopen the flow path;
    the valve element (22) being responsive to at least one control pressure ($p_1, p_2, p_3$) to vary the damping characteristic;
    the annular space (18) of the shock absorber (4, 4a) being connected directly, bypassing the damping valve (8, 8a), with the hydropneumatic spring (6) which produces the spring force; and
    an additional pressure accumulator (46/50) operative to store static pressure of the cylinder volume (16) and to supply that static pressure to operate the valve element, so that the static pressure is used as the at least one control pressure ($p_1, p_2, p_3$).

2. Suspension system according to claim 1, wherein the valve element (22) for closing and opening the flow path (20) cooperates with a valve seat (24) to form a non-return valve, such that the valve element (22) is on the one hand acted upon in its opening direction by hydraulic pressure $P_S$)

of the hydropneumatic spring (6) and on the other hand in its closing direction by hydraulic pressure ($p_F$) of the cylinder volume (16) of the shock-absorber (4) and additionally by an elastic closing force (F) in such a way that during a rebound flow the valve element (22) closes and opens the flow path (20) automatically, in that when the two hydraulic pressures ($P_S$, $P_F$) are in equilibrium or when there is relatively small pressure difference, the valve element closes, but in the closed position, as the pressure difference increases because the pressure ($p_F$) in the cylinder volume (16) of the shock-absorber (4) is falling, the valve element opens when the said pressure difference has reached a certain value.

3. Suspension system according to claim 1 further comprising:
   a control tappet (26) which acts upon the valve element (22) in the closing direction, and which is itself acted upon by the at least one control pressure ($p_1$, $p_2$, $p_3$) to vary the damping characteristic.

4. Suspension system according to claim 3, wherein the control tappet (26) comprises a stepped piston with a first step (28) facing the valve element (22) and acted upon by the hydraulic pressure ($p_F$) of the cylinder volume (16) of the shock-absorber, the first step being followed by a second step (32) of larger cross-section separated from the first step by a first annular ledge (30), and the second step being followed by a third step (36) of smaller cross-section separated from the second step by a second annular ledge (34), such that the second step (32) can be acted upon on the side of the first annular ledge (30) and in a first control pressure chamber (38) formed there by a first control pressure ($p_1$) and on the side of the second annular ledge (34) and in a second control pressure chamber (40) formed there by a second control pressure ($p_2$), and such that the third step (36) can be acted upon on its end face (42) facing away from the second step (32) and in a third control pressure chamber (44) formed there by a third control pressure ($p_3$).

5. Suspension system according to claim 4, wherein:
   the static pressure of the shock-absorber cylinder volume (16) contained in the additional pressure accumulator (46) is used as the second and third control pressures ($p_2$, $p_3$), and the first control pressure chamber (38) is connected directly to the shock-absorber cylinder volume (16), so that the dynamic pressure of the shock-absorber cylinder volume (16) acts as the first control pressure ($p_1$).

6. Suspension system according to claim 3 further comprising:
   a bypass circumventing the valve element (22) and having a channel extending through the valve element (22), such that the control tappet (26) also serves to close off or open up the bypass.

7. Suspension system according to claim 1, wherein:
   in a vehicle for the purpose of stabilizing rolling or pitching movements, at least two said suspension arrangements (1, 2) mutually cooperate by cross-over switching of the control pressures ($p_1$, $p_2$, $p_3$).

8. Suspension system according to claim 7, wherein:
   the annular space (18) of the shock-absorber (4, 4a) is connected directly to the same hydropneumatic spring (6) as the cylinder volume (16) of the same shock-absorber (4, 4a).

9. Suspension system according to claim 7, wherein:
   in each case the annular space (18) of the shock-absorber (4, 4a) of one suspension arrangement (1, 2) is connected directly to the hydropneumatic spring (6) of the other suspension arrangement (2, 1).

10. Suspension system according to claim 7, wherein:
    in the case of two suspension arrangements (1, 2) cooperating as a pair, at each damping valve (8, 8a) the static pressure of the cylinder volume (16) of the respective other shock-absorber contained within a first additional pressure accumulator (50) is used as the first control pressure ($p_1$), the dynamic pressure of the respective other shock-absorber cylinder volume (16), connected directly, is used as the second control pressure ($p_2$), and the static pressure of the cylinder volume (16) of the respective associated shock-absorber contained within a further additional pressure accumulator (50) is used as the third control pressure ($p_3$).

11. Suspension system according to claim 1, wherein:
    within the suspension arrangement (1, 2), there are at least two shock-absorbers (4, 4a) connected hydraulically in parallel.

12. Suspension system according to claim 11, wherein:
    on the one hand the cylinder volumes (16) and on the other hand the annular spaces (18) of the shock-absorbers (4, 4a) are in each case connected directly to one another, such that the cylinder volumes (16) are connected to the hydropneumatic spring (6) via the same damping valve (8).

13. Suspension system according to claim 11, wherein:
    the annular spaces (18) of the shock-absorbers (4, 4a) are connected directly to one another and to the respective hydropneumatic spring (6), while a damping valve (8, 8a) of its own is associated with each cylinder volume (16) and the damping valves (8, 8a) are on the other side connected with one another and with the hydropneumatic spring (6).

14. Suspension system according to claim 13, wherein:
    the damping valves (8, 8a) are connected in parallel in relation to the at least one control pressure ($p_1$, $p_2$, $p_3$).

15. Suspension system according to claim 1, wherein:
    the hydropneumatic spring (6) comprises a piston accumulator with a separating piston (58) which separates a hydraulic accumulation chamber (54) from a spring chamber (56) containing a compressible medium, and a separating piston rod (60) leading out of the piston accumulator, such that the separating piston (58) is acted upon via the separating piston rod (60) by an additional spring force ($F_F$).

16. Suspension system according to claim 15, wherein:
    the additional spring force ($F_F$) is produced by a pressure cylinder (62) acting upon the separating piston rod (60), so that the pressure cylinder (62) is connected to at least one reservoir (64) which produces a pre-stressing pressure.

17. Suspension system according to claim 16, further comprising:
    at least two said suspension arrangements (1, 2) with pressure cylinders (62) associated with their respective hydropneumatic springs (6), the suspension arrangements being interconnected by connection to the same pre-stressing pressure reservoir (64) to produce the additional spring force ($F_F$).

18. Suspension system according to claim 1, further comprising:
    a hydraulic non-return valve (66) acting in the direction opposite to the flow direction to which the flow path (20) guiding the rebound flow and the valve element (22) of the damping valve (8, 8a) are connected in parallel, which, when a compression flow occurs from the shock-absorber cylinder volume (16) towards the hydropneumatic spring (6), opens substantially without any throttling action and which closes when a rebound flow takes place.

19. Suspension system according to claim 1, wherein:

the connection between the shock-absorber cylinder volume (16) and the associated hydropneumatic spring (6) is selectively blocked by means of a blocking valve (70).

20. Suspension system according to claim 1, wherein:

the cylinder volume (16) of the shock-absorber (4, 4a) is selectively connected via a leveling device (72) either to a hydraulic pressure line (P) or to a tank return line (T).

21. Hydropneumatic suspension system for support in motor vehicles, with at least one suspension arrangement (1, 2), comprising at least one hydraulic spring strut (4, 4a), at least one hydropneumatic spring reservoir (6) and at least one damping valve (8, 8a), wherein the spring strut (4, 4a) comprises a cylinder (10) containing a hydraulic medium, and a piston (12), movably guided therein for spring compression and rebound, and the piston (12) separates a cylinder space (16) from an annular space (18) surrounding a piston rod (14), and wherein the cylinder space (16) is connected with the spring reservoir (6) via the damping valve (8, 8a) for the purpose of producing an elastic force, characterized in that the annular space (18) of the spring strut (4, 4a) is connected directly with the spring reservoir (6) while circumventing the damping valve (8, 8a);

the damping valve (8, 8a) being constructed in such a way that a hydraulic rebound flow, occurring during the rebound of the spring strut (4, 4a) and guided via a flow path (20) of the damping valve (8, 8a), is damped in that the flow path (20) is closed and reopened in a constantly alternating manner by means of a valve element (22);

the valve element (22), for the purpose of closing and opening the flow path (20), interacting with a valve seat (24) as a check valve, wherein the valve element (22), on the one hand, is charged in its opening direction with the hydraulic pressure ($p_s$) of the spring reservoir (6) and, on the other hand, in its closing direction, with the hydraulic pressure ($p_f$) of the cylinder space (16) of the spring strut (4) and is additionally charged with an elastic closing force (F) in such a way that the valve element (22), during a rebound flow, automatically closes and opens the flow path (20), the closure occurring in response to an equilibrium of the two hydraulic pressures ($p_s$, $p_f$) or in response to a certain, relatively low amount of a pressure difference that increases during the closed state due to the drop in pressure ($p_f$) within the cylinder space (16) of the spring strut (4) when a certain amount of pressure difference is reached;

the damping valve having a control tappet (26) which, in the direction of closing of the valve element (22), has an effect on the valve element and can be charged with control pressure ($p_1$, $p_2$, $p_3$) for the purpose of varying a damping characteristic of the damping valve;

the control tappet (26) comprising a differential piston with a first section (28) which is facing the valve element (22) and is charged by the hydraulic pressure ($p_f$) of the spring strut cylinder space (16), a second section (32) connecting to the first section via a first annular face (30) and with enlarged cross section and a third section (36) connecting with the second section (32) via a second annular face (34) and with diminished cross section, wherein the second section (32) can be charged on a side of the first annular face (30) and a first control pressure chamber (38) formed there with a first control pressure ($p_1$) and, on the side of the second annular face (34) and a second control pressure chamber (40) formed there, can be charged with a second control pressure ($p_2$), and wherein the third section (36), on a front face (42) turned away from the second section (32) and a third control pressure chamber (44) formed there, can be charged with a third control pressure ($p_3$);

the static pressure of the spring strut cylinder space (16), accommodated in a pressure reservoir (46), is used as the second and third control pressures ($p_2$, $p_3$); and the first control pressure chamber (38) is directly connected with the spring strut cylinder space (16) so that the dynamic pressure of the spring strut cylinder space (16) acts as the first control pressure ($p_1$).

22. Hydropneumatic suspension system for wheel support in motor vehicles, with at least one spring arrangement (1, 2), comprising at least one hydraulic spring strut (4, 4a), at least one hydropneumatic spring reservoir (6) and at least one damping valve (8, 8a), wherein the spring strut (4, 4a) comprises a cylinder (10) containing a hydraulic medium, and a piston (12), movably guided therein for spring compression and rebound, and the piston (12) separates a cylinder space (16) from an annular space (18) surrounding a piston rod (14), and wherein the cylinder space (16) is connected with the spring reservoir (6) via the damping valve (8, 8a) for the purpose of producing an elastic force, characterized in that the annular space (18) of the spring strut (4, 4a) is connected directly with the spring reservoir (6) while circumventing the damping valve (8, 8a);

the damping valve (8, 8a) being constructed in such a way that a hydraulic rebound flow, occurring during the rebound of the spring strut (4, 4a) and guided via a flow path (20) of the damping valve (8, 8a), is damped in that the flow path (20) is closed and reopened in a constantly alternating manner by means of a valve element (22);

the valve element (22), for the purpose of closing and opening the flow path (20), interacting with a valve seat (24) as a check valve, wherein the valve element (22), on the one hand, is charged in its opening direction with the hydraulic pressure ($p_s$) of the spring reservoir (6) and, on the other hand, in its closing direction, with the hydraulic pressure ($p_f$) of the cylinder space (16) of the spring strut (4) and is additionally charged with an elastic closing force (F) in such a way that the valve element (22), during a rebound flow, automatically closes and opens the flow path (20), the closure occurring in response to an equilibrium of the two hydraulic pressures ($p_s$, $p_f$) or in response to a certain, relatively low amount of a pressure difference that increases during the closed state due to the drop in pressure ($p_f$) within the cylinder space (16) of the spring strut (4) when a certain amount of pressure difference is reached;

the damping valve having a control tappet (26) which, in the direction of closing of the valve element (22), has an effect on the valve element and can be charged with control pressure ($p_1$, $p_2$, $p_3$) for the purpose of varying a damping characteristic of the damping valve;

the spring arrangement being one of at least two suspension arrangements (1, 2) operative to interact by means of crosswise controls of the control pressures ($p_1$, $p_2$, p₃) for the purpose of stabilizing rocking or dipping movements; and the annular space (18) of the spring strut (4, 4*a*) of the one suspension arrangement (1, 2) is directly connected with the spring reservoir (6) of the other suspension arrangement (2, 1).

23. Hydropneumatic suspension system for wheel support in motor vehicles, with at least one spring arrangement (1, 2), comprising at least one hydraulic spring strut (4, 4*a*), at least one hydropneumatic spring reservoir (6) and at least one damping valve (8, 8*a*), wherein the spring strut (4, 4*a*) comprises a cylinder (10) containing a hydraulic medium, and a piston (12), movably guided therein for spring compression and rebound, and the piston (12) separates a cylinder space (16) from an annular space (18) surrounding a piston rod (14), and wherein the cylinder space (16) is connected with the spring reservoir (6) via the damping valve (8, 8*a*) for the purpose of producing an elastic force, characterized in that the annular space (18) of the spring strut (4, 4*a*) is connected directly with the spring reservoir (6) while circumventing the damping valve (8, 8*a*);

within said at least one spring arrangement (1, 2), at least two hydraulic spring struts (4, 4*a*) arranged in parallel are provided; and on the one hand, cylinder spaces (16) and, on the other hand, annular spaces (18) of the spring struts (4, 4*a*), respectively, are directly connected with each other, whereby the cylinder spaces (16) are connected with the spring reservoir (6) via the same damping valve (8).

24. Hydropneumatic suspension system for wheel support in motor vehicles, with at least one spring arrangement (1, 2), comprising at least one hydraulic spring strut (4, 4*a*), at least one hydropneumatic spring reservoir (6) and at least one damping valve (8, 8*a*), wherein the spring strut (4, 4*a*) consists of a cylinder (10) containing a hydraulic medium, and a piston (12), movably guided therein for spring compression and rebound, and the piston (12) separates a cylinder space (16) from an annular space (18) surrounding a piston rod (14), and wherein the cylinder space (16) is connected with the spring reservoir (6) via the damping valve (8, 8*a*) for the purpose of producing an elastic force, characterized in that the annular space (18) of the spring strut (4, 4*a*) is connected directly with the spring reservoir (6) while circumventing the damping valve (8, 8*a*);

within said at least one spring arrangement (1, 2), at least two hydraulic spring struts (4, 4*a*) arranged in parallel are provided;

annular spaces (18) of the spring struts (4, 4*a*) are connected directly with each other and with the respective spring reservoir (6), while a cylinder space (16) of each spring strut is assigned its own damping valve (8, 8*a*) and the damping valves (8, 8*a*) are connected with each other and with the spring reservoir (6) on the side opposite to the cylinder spaces.

25. Suspension system, in accordance with claim 24, characterized in that the damping valves (8, 8*a*) are arranged in parallel.

26. Hydropneumatic suspension system for wheel support in motor vehicles, with at least one suspension arrangement (1, 2), comprising at least one hydraulic spring strut (4, 4*a*), at least one hydropneumatic spring reservoir (6) and at least one damping valve (8, 8*a*), wherein the spring strut (4, 4*a*) comprises a cylinder (10) containing a hydraulic medium, and a piston (12), movably guided therein for spring compression and rebound, and the piston (12) separates a cylinder space (16) from an annular space (18) surrounding a piston rod (14), and wherein the cylinder space (16) is connected with the spring reservoir (6) via the damping valve (8, 8*a*) for the purpose of producing an elastic force, characterized in that the annular space (18) of the spring strut (4, 4*a*) is connected directly with the spring reservoir (6) while circumventing the damping valve (8, 8*a*);

the damping valve (8, 8*a*) being constructed in such a way that a hydraulic rebound flow, occurring during the rebound of the spring strut (4, 4*a*) and guided via a flow path (20) of the damping valve (8, 8*a*), is damped in that the flow path (20) is closed and reopened in a constantly alternating manner by means of a valve element (22);

said at least one spring reservoir (6) is in the form of a piston reservoir with a separation piston (58) separating a hydraulic reservoir space (54) from a spring chamber (56) containing a compressible medium, and a separation piston rod (60) extends out of the piston reservoir, wherein the separation piston (58) is charged via the separation piston rod (60) with an additional elastic force ($F_f$); and the additional elastic force ($F_f$) is produced by a pressure medium cylinder (62) acting on the separation piston rod (60), wherein the pressure medium cylinder (62) is connected with at least one reservoir (64), producing a pretension pressure.

27. Suspension system, in accordance with claim 26, characterized in that at least two spring arrangements (1,2) are interconnected due to the fact that the pressure medium cylinders (62), assigned to their spring reservoirs (6) for the purpose of producing the additional elastic force ($F_f$), are connected with the same pretension pressure reservoir (64).

* * * * *